Sept. 10, 1940. H. J. SCHNEIDER Re. 21,561
STEAM GENERATOR
Original Filed Feb. 14, 1935 2 Sheets-Sheet 1
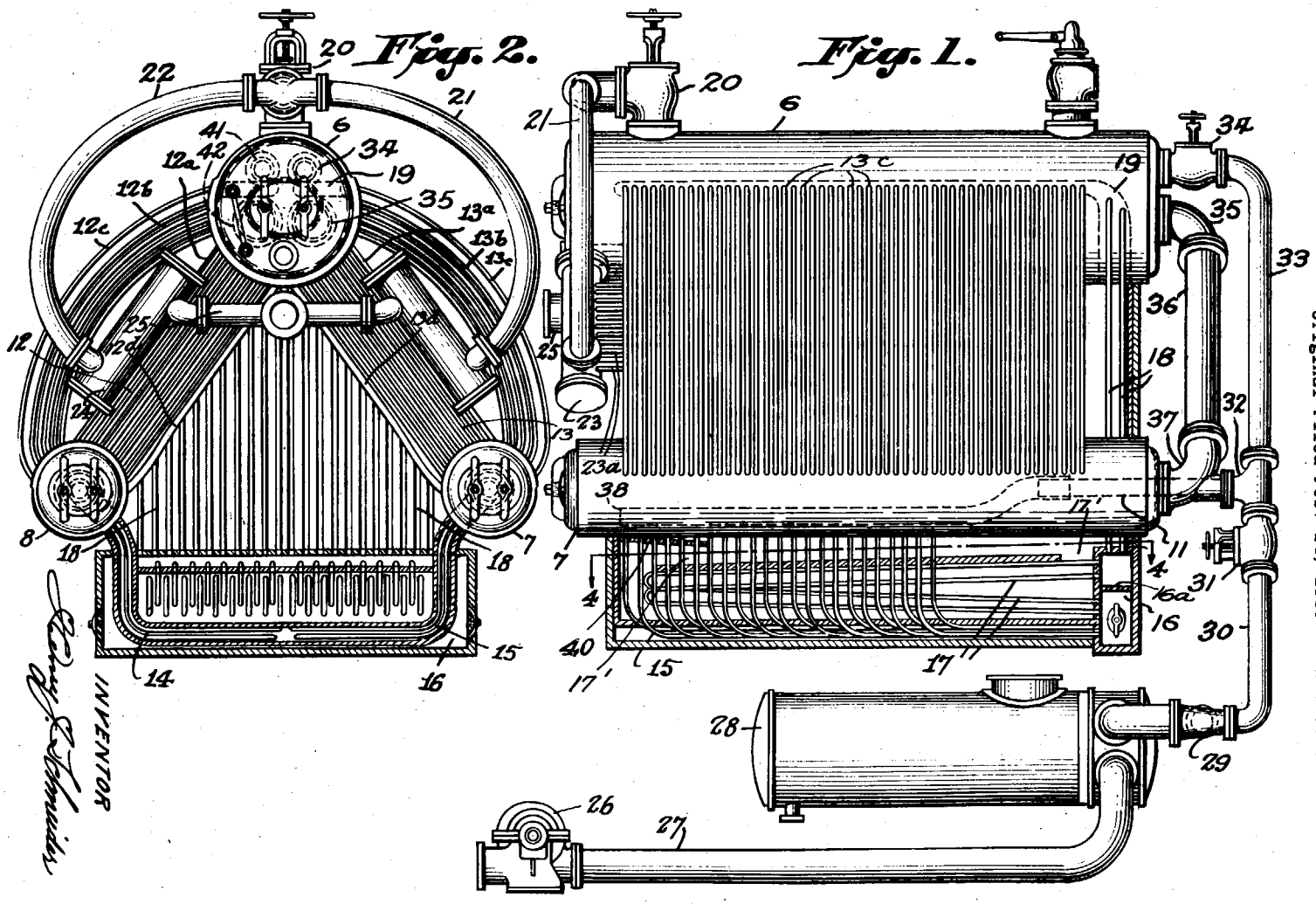

Sept. 10, 1940. H. J. SCHNEIDER Re. 21,561

STEAM GENERATOR

Original Filed Feb. 14, 1935 2 Sheets-Sheet 2

INVENTOR
Henry J. Schneider

Reissued Sept. 10, 1940

Re. 21,561

UNITED STATES PATENT OFFICE 21,561

STEAM GENERATOR

Henry J. Schneider, Quincy, Mass.

Original No. 2,028,925, dated January 28, 1936, Serial No. 6,523, February 14, 1935. Application for reissue April 13, 1937, Serial No. 136,698

6 Claims. (Cl. 122—328)

My invention relates to that of steam generators and more particularly to the type embodying a Yarrow boiler, and it consists in constructions, arrangements and combinations herein described and claimed.

It is the object of the invention to provide a Yarrow type boiler with a radiant tube installation arranged so as to increase the temperature of feed water through the tubes, thus providing a steam generating unit to obtain a higher transfer of heat between combustion gases and heated feed water with a comparatively small unit of high efficiency.

It is a further object of this invention to provide a steam generating unit in which the steam drum, water drums and tubes also a superheat generator of a reliable type with a high output have such a relationship to one another as to readily permit building of an installation, in a comparatively small and compact unit and in which practically all heat units are utilized in production of steam.

Additional objects, advantages and features of my invention will be apparent from the following description considered and in conjunction with the accompanying drawings, wherein Figure 1 is a side elevation embodying my invention.

Figure 2 is a front elevation thereof.

Figure 4:
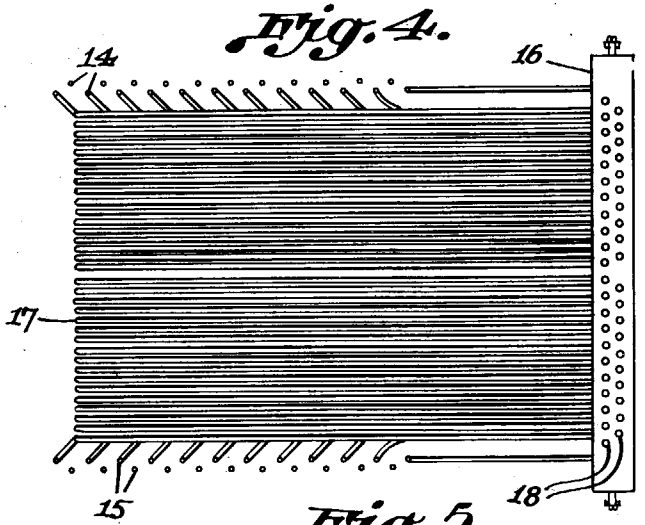
Figure 4 is a sectional view on the line 4—4 of Figure 1.
Figure 5:
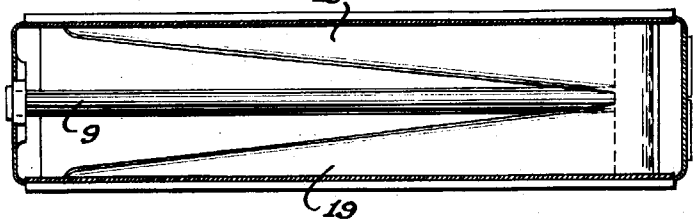
Figure 5 is a sectional view on line 5—5 of Figure 3.

Referring to the drawings and particularly Figures 1 to 5 inclusive, there is illustrated a water and steam boiler 6, including an auxiliary feed water inlet 9. The boiler 6 may be of suitable capacity and construction, and associated therewith are water drums 7 and 8, including main feed inlets 10 and 11. The water drums 7 and 8 extend in a plane parallel with the boiler 6 but at a distance downwardly therefrom. In practice, the boiler 6 would occupy a position in the upper portion of a combustion chamber or fire-box and the water drums 7 and 8 would be positioned in respective side walls of the fire-box. The boiler 6 and respective water drums 7 and 8 are interconnected by respective banks of water tubes 12 and 13, these tubes extending diagonally inward over the firebox and enter boiler 6 upon its under side.

Each bank of water tubes 12—13 provides a multiplicity of innermost tubes 12*a* and 13*a*, respectively, in direct communication with the products of combustion and an intermediate multiplicity of tubes 12*b* and 13*b*. By this arrangement, the tubes 12*a* and 13*a* by virtue of direct contact with the products of combustion will act to conduct a rapid transfer of heat between combustion gases and heated water to the boiler 6 and the outermost tubes 12*c* and 13*c* will act as convection tubes, permitting the unevaporated water to gravitate from boiler 6 to the respective water drums 7 and 8, thus permitting a rapid circulation of heated water between boiler 6 and water drums 7 and 8. Preferably, the tubes comprising the banks 12 and 13 are varying in diameters, the largest being positioned adjacent the greatest furnace heat as indicated at 12*d* and 13*d*. In order that advantage may be taken of all possible heating area of combustion chamber, the main feed water is fed through the inlets 10 and 11 into respective closed extensions 38 and 39 thereof, the extensions being disposed in respective water drums 7—8. Connected with the extensions 38—39 there are spectively, water tubes 14 and 15. The tubes 14 and 15 extend downwardly to occupy a position parallel with the side walls of a fire-box and at a suitable point in the foundation of the steam generator, the tubes 14—15 are bent, and extend varying distances from their respective positions in the side walls of a fire-box to a point medially of the boiler and are thence abruptly bent and extended rearwardly toward the rear wall of combustion chamber, where they are secured into a water-box 16. The water tubes 14—15 thus provide a water wall and water floor which are covered with a suitable refractory material which will act as a conductor for heating feed water in tubes 14—15 associated with water drums 7 and 8 and water-box 16. The exterior of the water tubes 14—15 are covered with a suitable heat resisting insulation. Herewith I provide a secondary unit 17 which comprises a multiplicity of U shaped tubes extending forward at a suitable distance and secured into water-box 16. The water box 16 is longitudinally divided by a wall 16*a* defining the upper and lower chambers and the tubes 17 are connected between the upper and lower chambers of water-box 16, thereby permitting feed water to be heated to a higher temperature due to circulation through tubes 17. Tubes 17 will be covered on their top sides with a refractory material which has the quality of resisting clinker adhesion.

An opening 17′ in the covering will be retained at each end, with an apron 40 over the front end of said refractory material to permit furnace heat to circulate thereunder. A multiplicity of tubes 18 are connected between water-box 16 and rear portion of the boiler 6, and these tubes 18 are directly exposed to furnace heat to further permit the heating of feed water. The tubes 18 open upon a box or chamber 19 so as to direct the feed water through the tubes 12c and 13c which are connected with the box or chamber 19 and thence into water drums 7 and 8 as shown in Figures 1, 2, 3 and 5.

From the foregoing, it will be apparent that the feed water will pass through the inlets 10 and 11 into the water drums 7 and 8 through tubes 14 and 15, and 17, the water-box 16, and thence through the tubes 18, chamber 19, and finally down through tubes 12c and 13c to water drums 7 and 8. The feed water has thus attained a high degree of temperature. Preferably between tubes 12b and 13b and 12a and 13a there is shown a space in which a superheater of any approved type may be installed, the tubes 23a of said superheater extending parallel to those of the boiler 6 and water drums 7 and 8 to generate a higher degree of superheat, as clearly shown in Figure 1.

Steam is taken from the boiler 6 through a central outlet T valve 20 to which pipes 21 and 22 are associated, the pipes being connected with respective superheaters 23 and 24. The common outlet header 25 may be connected to a delivery pipe not shown.

Figure 3:
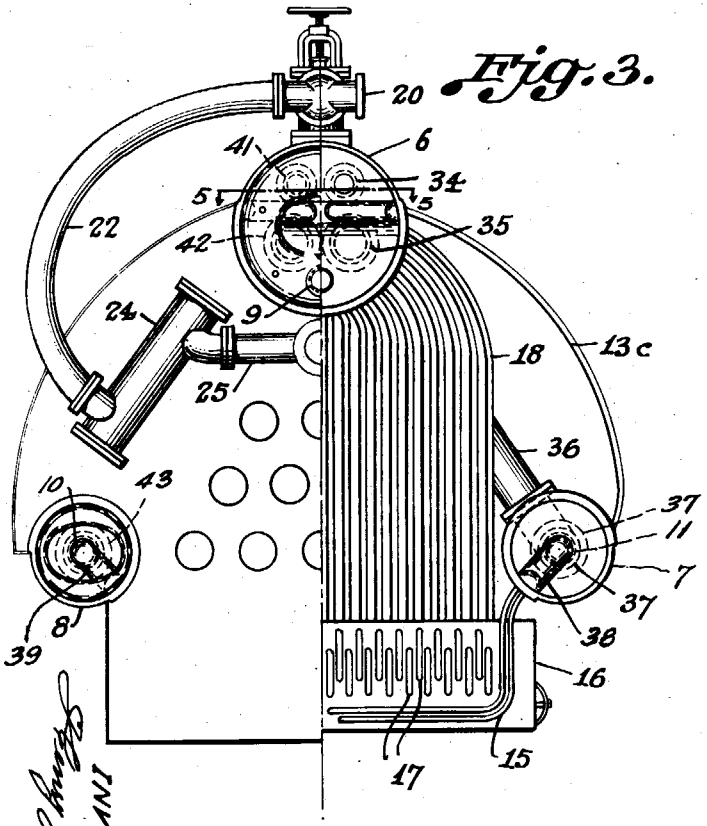
Figure 3 is in part the front elevation of the enclosure with apertures for fuel injection and in part showing the rear and outer wall water tubes of my invention.

In Figure 1 a complete unit is shown and comprises a feed pump 26, a feed line 27 and a heater 28 from which a pipe 30 extends for connection with the upper and lower chambers of the installation. The pipe 30 includes a T-fitting 32 establishing connection with a feed inlet 11, and from one side of the fitting 32 there is a pipe 33, which is connected with an upper portion of a boiler 6. The pipe 30 has installed therein a valve 31, and the pipe 33 has a valve 34. The T-connection 29 provides for connection of a similar series of pipes and valves for the opposite drum 8, connection being made through fittings 41—42 and 43, as shown in Figure 3. In operation, normally, the valves 31 are open and the valves 34 are closed, but in emergency where an auxiliary feed is essential, the valves 34 are opened.

The boiler 6 is connected to the drums 7—8 by suitable pipes 36, including elbow fittings 35—37, these pipes being commonly known as "downcomers."

Various constructions of water-boxes may be employed, but in Figure 1, I have shown a construction of preferred square type with a division plate 16a therein to define upper and lower chambers, the front and upper side of which is suitably apertured for reception of water tubes or similar tubes. By providing apertures on all sides of box 16 numerous pipe connections may be made and those apertures which are not required in installation may be closed by use of any suitable plug.

I have found that the arrangement above described in which the top drum is centrally situated in the lower side walls of the combustion chamber, a complete unit comprising the water walls, water floors, and radiant tubes is provided having the advantage that it permits the raising of feed water temperature to a very high degree to a given floor area, which is an important factor of marine installation.

The invention herein disclosed is in some aspects an improvement over that of my prior application, Serial No. 667,554, filed April 24, 1933, for Steam generators.

I claim:

1. A boiler comprising a substantially horizontal upper chamber, two lower smaller substantially horizontal chambers defining the upper lateral boundaries of a fire-box, an inner bank of generating tubes connecting respective lower chambers to said upper chamber, and an outer bank of convection tubes connecting respective lower chambers to said upper chamber, a multiplicity of water tubes extending downwardly from respective lower chambers and defining the sides of a water wall of the fire-box, water tubes communicating with the last named tubes arranged to form a water floor of the fire-box, water tubes communicating with the last named tubes arranged to form a heater in the fire-box, water tubes communicating with the last named tubes arranged to define a back wall in the fire-box, and water tubes connected between said upper chamber and said two lower chambers arranged to define a water wall beyond the convection tubes and communicating with the tubes of said walls, floor, heater and boiler.

2. A boiler set forth in claim 1, together with superheater elements intermediate the generating tubes and convection tubes.

3. A boiler comprising a substantially horizontal upper chamber, two lower smaller substantially horizontal chambers defining the upper lateral boundaries of a fire-box, an inner bank of generating tubes connecting respective lower chambers to said upper chamber, an outer bank of convection tubes connecting respective lower chambers to said upper chamber, a multiplicity of water tubes extending downwardly from respective lower chambers and defining the sides of a water wall of a fire-box, water tubes communicating with last named tubes arranged to form a water floor of a fire-box, a water-box in communication with said last named tubes, a multiplicity of tubes in communication with said last named water-box to define a back water-wall, a water-box in the upper chamber in communication with said last named tubes, and a multiplicity of tubes in communication with said last named water-box and respective lower chambers defining the outer wall of convection tubes.

4. A boiler set forth in claim 1 wherein the generating tubes vary in diameter.

5. A boiler comprising a substantially horizontal upper chamber, two lower smaller substantially horizontal chambers defining the upper lateral boundaries of a fire-box, an inner bank of generating tubes connecting respective lower chambers to said upper chamber, an outer bank of convection tubes connecting respective lower chambers to said upper chamber, a multiplicity of water tubes extending downwardly from respective lower chambers and defining the sides of a water wall of a fire-box, water tubes communicating with last named tubes arranged to form a water floor of a fire-box, a water-box in communication with said last named tubes, a multiplicity of water tubes in communication with said last named water-box to define a back water wall of the fire-box, a water-box in the upper chamber in communication with said last named tubes, and an outer element of larger water pipes in communication with the water walls of lower chambers and upper chamber.

6. A boiler comprising a substantially horizontal upper chamber, two lower smaller substantially horizontal chambers defining the upper lateral boundaries of a fire-box, an inner bank of generating tubes connecting respective lower chambers to said upper chamber, an outer bank of convection tubes connecting respective lower chambers to said upper chamber, a multiplicity of water tubes extending downwardly from respective lower chambers and defining the sides of a water wall of a fire-box, water tubes communicating with last named tubes arranged to form a water floor of a fire-box, a water-box in communication with said last named tubes, a multiplicity of water tubes in communication with said last named water-box to define a water heater, a multiplicity of tubes in communication with said last named water-box to define a back water wall, a water-box in the upper chamber in communication with said last named tubes, feed water inlet pipes in communication with the lower chambers, and down-comer water pipes connected between the upper and lower chambers.

HENRY J. SCHNEIDER.